Sept. 9, 1952 R. L. LARSON 2,609,648
CANE HARVESTER
Filed Nov. 21, 1950 2 SHEETS—SHEET 1
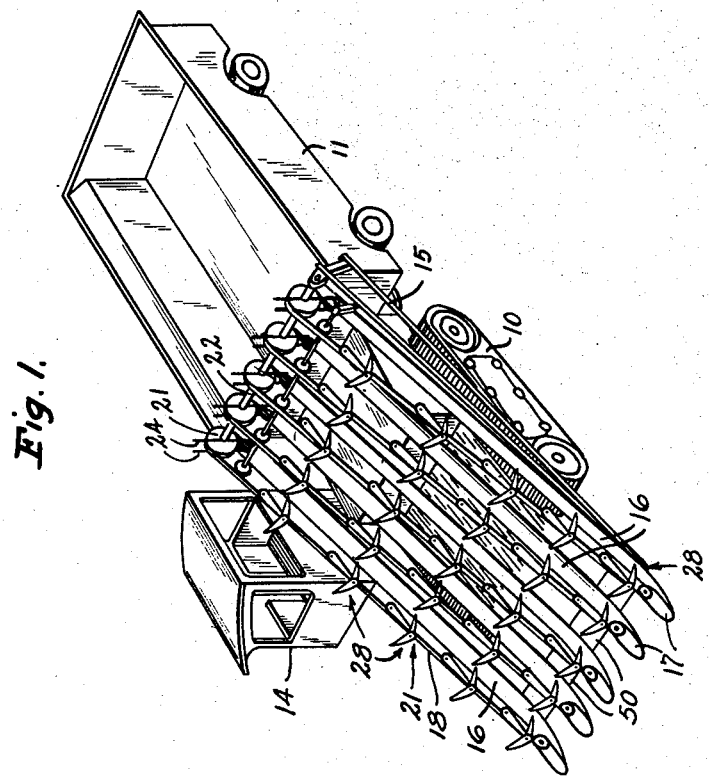
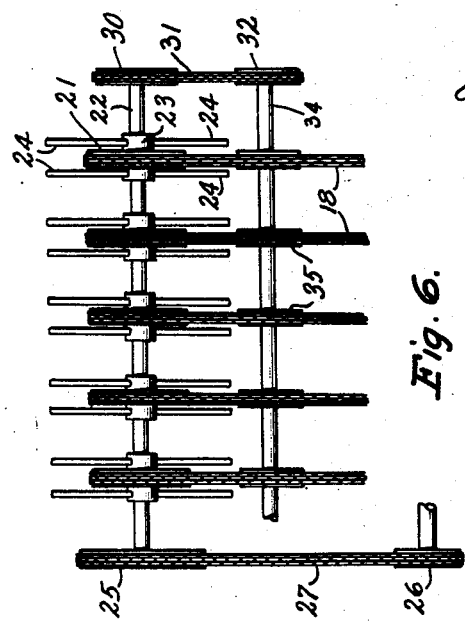
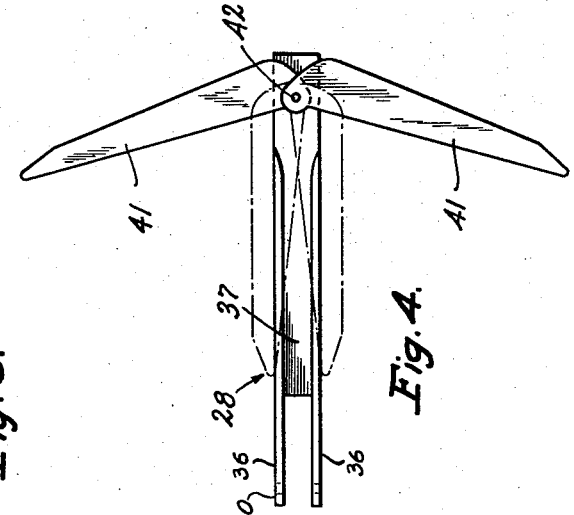
INVENTOR
RALPH LARSON,
BY Munn, Liddy & Glaccum
ATTORNEYS Sept. 9, 1952  R. L. LARSON  2,609,648
CANE HARVESTER
Filed Nov. 21, 1950  2 SHEETS—SHEET 2
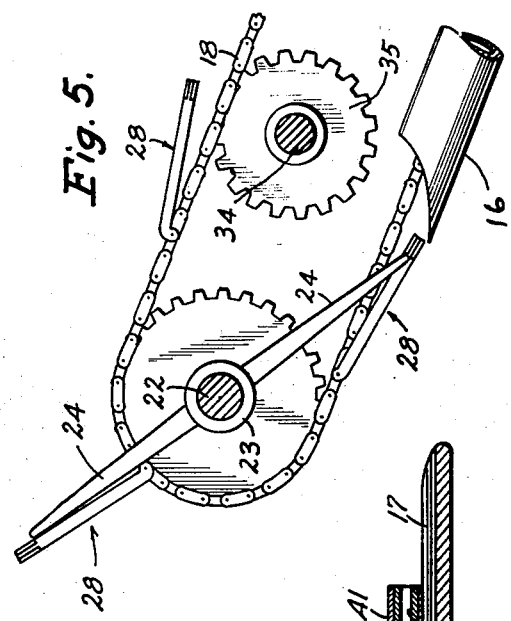
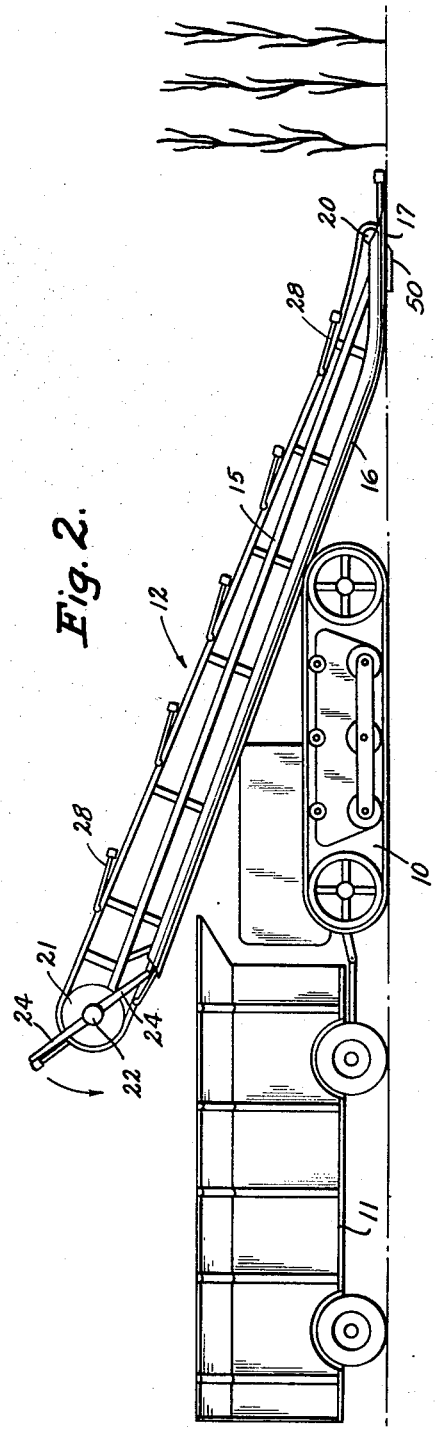
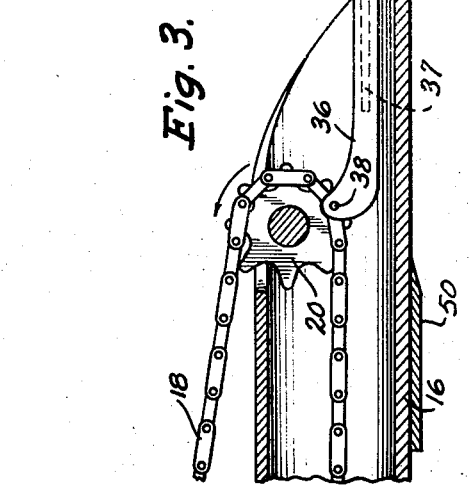
INVENTOR
*RALPH LARSON,*
BY
*Munn, Liddy, & Glaccum*
ATTORNEYS Patented Sept. 9, 1952

2,609,648

UNITED STATES PATENT OFFICE 2,609,648

CANE HARVESTER

Ralph L. Larson, Honolulu, Territory of Hawaii

Application November 21, 1950, Serial No. 196,891

3 Claims. (Cl. 55—108)

The present invention is a continuation-in-part of pending application Serial No. 51,524, filed September 28, 1948, now abandoned.

This invention relates to cane harvesters and has for its object to provide a self-propelled cane-picking and loading machine which is relatively simple in construction, highly economical in operation, pronouncedly efficient in effecting an approach to the complete picking of all cane included in any given crop to be harvested, and capable of carrying out the cane-picking and loading operations in such manner that a minimum of soil is retained in the cane incident to its removal from the ground and incident to the completion of any given loading operation as effected by the machine embodying the present invention.

To the above and other ends this invention broadly contemplates a self-propelled harvesting machine, including a tractor to which is connected a trailer and on which is carried an upwardly and rearwardly inclined cane-picking and conveyor unit. The lower end of said unit precedes the front end of the tractor at substantially ground level and its upper end overhangs the rear end of the tractor and is there so located as to deliver the cane to the trailer incident to the picking and loading operation as effected by the unit. This arrangement of parts is also characterized by the fact that the frame of the unit includes a plurality of cane pulling unit guides, each in the form of tubular guides disposed generally lengthwise of the machine in a parallel relation to each other and respectively accommodating the lower reaches of a plurality of sprocket chains, passing over sprockets arranged in lower and upper groups, the sprockets of the lower group being mounted on said guides at their lower ends and those of the upper group being journaled on a driven shaft suitably mounted on said frame. These chains carry in fixed relation thereto a plurality of cane-stripping and hook-actuating arms, by which delivery of cane to the trailer is facilitated and by which a plurality of collapsible cane-pulling units are successively conditioned for entrance into the upper ends of said guides by moving their respectively associated cane-engaging hooks towards each other so that the cane-pulling units may unobstructedly pass downwardly through the guides. The latter are utilized to thrust the hook-bearing cane-pulling units into the cane where they became so fouled in the cane that they are automatically opened in order that they may function to remove from the ground the cane with which they are engaged when the direction of their travel is reversed. This action occurs as the chains move over the lower group of sprockets and begin to ascend along their upper reaches, the hooks that are included as elements of each cane-pulling unit being such that the cane with which they become fouled when thrust into the same is removed from the ground as the pulling-units reverse their direction of movement in passing over the lower group of sprockets. The cane thus removed is also conveyed upwardly and rearwardly to the discharge end of the machine and there deposited into the trailer as it follows along in the path of the tractor.

Other objects of the invention will become apparent from the following description when considered in connection with the accompanying drawing, in which:

Figure 1 is a perspective view showing generally a harvester embodying the present invention, certain elements being omitted in the interest of clarity.

Figure 2 is a side elevation of the harvester as viewed from the far side in Fig. 1, certain elements such as the control cab being omitted to simplify the illustration.

Figure 3 is a fragmental vertical sectional view showing in detail the relation of one of the sprocket chains to one of the associated cane-pulling units as the latter is being thrust forwardly into cane-engaging position.

Figure 4 is a plan view of one of the cane-pulling units, the hingedly supported cane-engaging hooks of which are illustrated in dotted lines as occupying their collapsed positions and in full lines as occupying their extended or cane-engaging positions.

Figure 5 is a fragmentary view showing partly in elevation and partly in section the delivery end of the cane-picking and conveyor unit and illustrating the manner in which the cane-pulling units are successively conditioned for entry into the upper end of the respective cane-pulling unit guides, and Figure 6 is a schematic plan view illustrating a suitable power transmission mechanism by which the several sprocket chains carrying the cane-pulling units are driven at a speed somewhat slower than that of the cane-stripping and hook actuating arms.

As shown in Figures 1 and 2, the machine herein illustrated as one embodiment of the present invention includes a tractor 10, of the conventional gas-engine driven type, to the rear end of which is connected a suitable trailer 11 and on which is carried a combined cane-picking and conveyor unit 12, the lower end of which precedes the front of the tractor at slightly below ground level and the upper end of which overhangs the rear end of the tractor and is there so located as to deliver cane to the trailer in carrying out the loading operation as the tractor is propelled along its course of travel under the control of an operator stationed in an appropriate control-cab 14 (Fig. 1) conveniently located at one side of the tractor and suitably supported thereon.

The cane-picking and conveyor unit 12 includes a suitable frame comprising a pair of side rails 15 and a plurality of cane-pulling unit guides 16, each in the form of a tubular guide or pipe. The guides 16, herein shown as five in number, are included as elements of the frame and are suitably connected in a rigid relation to each other and to the side rails 15 so as to lend rigidity to the entire frame.

As will be understood from an inspection of Figs. 1 and 2, the guides 16 are disposed generally lengthwise of the machine in a parallel relation to each other and to the side rails 15 and collectively constitute the lower or base section of the frame. Referring to Figs. 2 and 5, it will be noted that the upper open ends of the several guides 16 are located somewhat short of the extreme upper end of the cane-picking and conveyor unit 12 and that said guides are so bent or shaped relatively near their respective lower ends as to enable them throughout a substantial portion of themselves to closely approach ground lines ahead of the tractor 10 as it is moved along a definite path during the harvesting operation. As will be understood, especially from a consideration of Fig. 3, each of the guides 16, at its lower end, is cut away so as to there provide a relatively long forwardly projecting finger 17 which is arcuate in cross section and relatively pointed at its forward extremity so as to enable it to enter with ease between the standing stalks of cane as the harvester is moved forwardly.

Associated with the several guides 16 are a plurality of sprocket chains 18 which are so arranged that their lower reaches are accommodated within the respective guides and are adapted to pass downwardly through the same under power derived from the tractor 10 and transmitted to said chains by suitable means hereinafter more particularly described. The chains 18 are supported for operation by suitable sprockets 20 and 21, the former being disposed at the lower end of the cane-picking and conveyor unit 12 and the latter being arranged at the upper or discharge end thereof.

Referring particularly to the sprockets 20, it will be noted that they are respectively so supported at the lower ends of the several guides 16 that a substantial portion of each sprocket projects upwardly out of its associated guide and that the remaining portion thereof is located substantially within such guide. As to the sprockets 21, it will be observed that they are respectively disposed in alinement with their companion sprockets 20 and are journaled on a shaft 22 suitably supported for rotation at the upper end of the unit 12.

Referring especially to Figs. 5 and 6, it will be seen that a plurality of collars 23 are rigidly connected to the shaft 22, each of said collars carrying at diametrically opposite points thereon a pair of outwardly extending cane-stripping and hook- actuating arms 24. As shown most clearly in Fig. 6, one pair of the arms 24 is located at each side of and in relatively close proximity to each sprocket 21, but yet each pair of arms are spaced a sufficient distance from its companion pair of arms to permit the sprocket chains 18 to pass unobstructedly over the several sprockets.

The drive shaft 22 is rotated through the medium of a pair of sprockets 25 and 26 connected to each other by a sprocket chain 27, the sprocket 25 being secured to one end of said drive shaft and the sprocket 26 being adapted to function as a power take-off element appropriately connected to the power unit of the tractor 10 in accordance with well known practice.

In order that the sprocket chain 27 may be driven at a somewhat slower speed than the cane-stripping and hook-actuating arms 24, the arm-bearing shaft 22 is utilized as an important element of a power transmission, such as is illustrated in Fig. 6 and by which the necessary speed of travel of said chains is effected to facilitate delivery of cane to the trailer 11 and to insure unobstructed entry into the guides 16 of a plurality of collapsible cane-pulling units 28 carried by the sprocket chains 18 and hereinafter more particularly described.

The above mentioned power transmission further includes a sprocket 30 secured to the drive shaft 22 and connected by a sprocket chain 31 to a sprocket 32 fastened to one end of a shaft 34 suitably journaled on the unit 12 near the upper end thereof and disposed in a parallel relation to said drive shaft. To the shaft 34 are connected a plurality of drive-sprockets 35 which are respectively disposed in alinement with the several sprockets 21 and over which the upper reaches of the sprocket chains 18 pass in driven engagement therewith.

With respect to the above mentioned cane-pulling units 28 (Fig. 4) it will be noted that they are spaced from each other along the length of the respective sprocket chains 18 by which they are carried and that each unit includes a pair of side plates 36 between which is secured a spacing tongue 37 which is of such width that the side plates are so spaced from each other that the individual sprocket chains 18 may be accommodated between the pivot-ends of the same. Here it may be mentioned that each of the cane-pulling units 28 carried by any given sprocket chain 18 is pivotally connected to such chain by suitable pins 38 which pass through alined openings 40 (Fig. 4) provided in the pivot-ends of the side plates 36, said pins being adapted to also serve in pivotally connecting adjacent chain links to each other at points where the cane-pulling units are pivotally attached to the several chains. At the forward end of each cane-pulling unit 28 there is pivotally connected a pair of wing-like cane-engaging hooks 41. The latter are preferably of channel-like construction, the flanges of one being disposed as shown in Figs. 3 and 4, in an overlapping relation to the flanges of the other at the forward end of the unit 28 and there pivotally connected to the spacing tongue 37 by a pin 42. It will be observed from the dotted lines in Fig. 4 that the arms 41 are adapted to be folded into a substantially parallel relation to each other and to the side plates 36 and spacing tongue 37, in which case said plates and said tongue are accommodated intermediate the flanges of the respective hooks 41. The hooks 41 are folded back into their collapsed or dotted line positions under the action of the cane-stripping and hook-actuating arms 24 by forcing the extended hooks into chute 16 in a leading position after the cane-pulling units 28 pass over the several sprockets 21 and such units have delivered their respective loads of cane to the trailer 11, thus making it possible for said units to unobstructedly enter and pass downwardly through the guides 16. As the pulling units 28 reach the lower ends of the guides 16, they are thrust forwardly into the standing cane under the driving action of the sprocket chains 18 and are thus caused to become fouled with the cane so that their hooks 41 are moved outwardly to their full line positions, reference being had to Fig. 4, as the direction of movement of said units is reversed in moving over the sprockets 20 and beginning their ascent in unison with the upper reaches of their respectively associated sprocket chains. In this connection, it will be noted that the hooks 41 are limited in their opening movements by reason of the fact that the shoulders, at their pivoted ends, are adapted to engage their respective sideplate spacing tongues 37 as they assume their full line positions, as illustrated in Fig. 4.

It will be understood, of course, as the pulling units 28 begin their upward movement in unison with the upper reaches of the sprocket chains 18, the cane, with which the hooks 41 are then fouled or engaged, will be removed from the ground and then carried or dragged by such units to the discharge end of the unit 12 where the cane-stripping and hook-actuating arms 24 so function as to facilitate removal of the cane from said units and effect its delivery to the trailer 11. With respect to the cane-stripping and hook-actuating arms 24, it may be well to here emphasize the fact that they are adapted to function both in stripping the cane from the units 28 and in conditioning such units for entry into the guides 16.

The drive means for chains 18, as seen in Fig. 6, is such that the several sprockets upon which the chains ride, are each driven at such speed that the units 28 are angularly moved at a slower speed as they pass over the sprockets 21 than are the cane-stripping and hook-actuating arms adjacent said sprockets. The units 28 are so spaced from each other along the length of the chain that one set of members 24 will contact wings 14 and pivot said wings counter-clockwise about pin 38 until a position is reached as shown in Figure 5 at the uppermost end. The members 24 continue to rotate with the chain but always maintaining the wings in a leading position. Gradually the arms 24 lift the ends of the units up for entrance head first into guide 16. In fact the ends of members 24 pass by the inner edges of the wings just in time to drop the unit into the guide. As the units enter the guide the wings strike the edges of the guide and are folded into the dotted line position of Fig. 4. In other words, the timing of the rotation of members 24, the speed of the chain 18 which carries units 28, and the spacing of the units 28 along the chain are such that the action above described is produced.

In the event the stand or maturity of the cane in a field is such that the roots of the plants will rejuvenate and bring forth a successive crop and the root boles are not too large, replanting may be avoided by merely severing the stalks, thus leaving the roots in the ground. To this end I provide a removable cutter 50 which extends across and is removably attached beneath the guides 16, somewhat in rear of their projecting finger portions 17, as shown in Figs. 1 and 3, the arrangement being such that the roots are cut off at the ground surface.

In view of the foregoing, it is believed that no further description of the machine, either as to its details or its mode of operation, is necessary to a complete understanding of the same by those skilled in the art to which the present invention pertains. However, it will be understood that various changes and substitutions may be made with respect to the present disclosure without departing from the spirit of the invention or the scope of the following claims.

I claim:

1. A cane harvester adapted to be moved under traction power over a definite course in removing or cutting cane from the ground and in delivering such cane to a trailer when following such course, said harvester including a cane-picking and conveyor unit comprising a frame characterized by the fact that it includes a plurality of cane-pulling unit guides, a plurality of sprocket chains, the lower reaches and upper reaches of which are adapted to pass downwardly through and upwardly above said guides, a plurality of collapsible cane-pulling units carried by each of said chains, means for effecting a collapsed condition of each of said units in preparing them for travel in said guide when moving in unison with the lower reaches of their associated chains, said cane-pulling units when collapsed being adapted to pass through said guides and to be thereafter thrust under the action of their associated chains into fouling engagement with the cane to be harvested whereby such units incident to reversal of movement thereof in proceeding upwardly in unison with the upper reaches of their associated chains are caused to withdraw from the ground such cane as is in fouled engagement therewith and deliver that cane to said trailer from the delivery end of said cane-picking and conveyor unit.

2. A cane harvester adapted to be moved under traction power over a definite course in removing or cutting cane from the ground and in delivering such cane to a trailer when following such course, said harvester including a cane-picking and conveyor unit comprising a frame characterized by the fact that it includes a plurality of cane-pulling unit guides, a plurality of sprocket chains, the lower reaches and upper reaches of which are adapted to pass downwardly through and upwardly above said guides, a plurality of cane-pulling units carried by said chains and adapted to enter said guides in following the course of travel of the lower reaches of said chains as such reaches move through said guides, each of said cane-pulling units including a pair of pivotally supported cane-engaging hooks adapted to be thrust into cane engaging relation to the cane at the lower ends of said guides and to thereafter effect removal of such cane from the ground and then move it upwardly to the delivery end of said cane-picking and conveyor unit, and cane-stripping and hook-engaging arms adapted to facilitate removal of cane from said hooks at the delivery end of said cane-picking and conveyor unit and to thereafter move said cane engaging hooks into a position leading their pivot for conditioning said cane-pulling units for entry into said guides.

3. A cane harvester adapted to be moved under traction power over a definite course in removing or cutting cane from the ground and in delivering such cane to a trailer when following such course, said harvester including a cane-picking and conveyor unit comprising a frame characterized by the fact that it includes a plurality of cane-pulling unit guides, a plurality of sprocket chains, the lower reaches and upper reaches of which are adapted to pass downwardly through and upwardly above said guides, a plurality of cane-pulling units carried by said chains and adapted to enter said guides in following the course of travel of the lower reaches of said chains as such reaches move through said guides, each of said cane-pulling units including a pair of pivotally supported cane-engaging hooks adapted to be thrust into cane-engaging relation to the cane at the lower ends of said guides and to thereafter effect removal of such cane from the ground and then move it upwardly to the delivery end of said cane-picking and conveyor unit, and cane-stripping and hook-engaging arms adapted to facilitate removal of cane from said hooks at the delivery end of said cane-picking and conveyor unit and to thereafter move said cane engaging hooks for entrance into said guides, and means for rotating said arms at a speed greater than that at which said cane-pulling units are moving when being freed of their respective loads of cane and while thereafter moving towards the entrance ends of said guides.

RALPH L. LARSON.

No references cited.